US012728683B2

(12) United States Patent
Gorski et al.

(10) Patent No.: US 12,728,683 B2
(45) Date of Patent: Sep. 8, 2026

(54) DAMPER BUMPER CAP WITH COLLECTOR

(71) Applicant: Advanced Suspension Technology LLC, Northville, MI (US)

(72) Inventors: Tomasz Gorski, Laziska Gorne (PL); Koen Joseph R. Spaas, Borgloon (BE); Mikel Arriaga, Bilbao (ES)

(73) Assignee: Advanced Suspension Technology LLC, Northville, MI (US)

(*) Notice: Subject to any disclaimer, the term of this patent is extended or adjusted under 35 U.S.C. 154(b) by 405 days.

(21) Appl. No.: 18/378,898

(22) Filed: Oct. 11, 2023

(65) Prior Publication Data

US 2025/0121640 A1 Apr. 17, 2025

(51) Int. Cl.
*B60G 13/06* (2006.01)

(52) U.S. Cl.
CPC .......... *B60G 13/06* (2013.01); *B60G 2202/24* (2013.01)

(58) Field of Classification Search
CPC ............................ B60G 13/06; B60G 2202/24
USPC ........................................ 188/322.16–322.19
See application file for complete search history.

(56) References Cited

U.S. PATENT DOCUMENTS 6,217,012 B1 4/2001 Hashirayama
9,829,062 B2 11/2017 Tsunekawa
10,816,055 B2 * 10/2020 Górski ...................... F16F 9/36
11,566,679 B2 * 1/2023 Górski ...................... F16F 9/36
11,649,872 B2 * 5/2023 Barton .................. F16F 9/3207 280/124.162
2019/0293145 A1 9/2019 Henneberg et al.
2019/0331192 A1 10/2019 Górski et al.

FOREIGN PATENT DOCUMENTS

| | | | |
|---|---|---|---|
| CN | 202756530 | U | 2/2013 |
| CN | 212155621 | U | 12/2020 |
| DE | 112019002191 | T5 | 2/2021 |
| EP | 3260731 | A1 | 12/2017 |
| EP | 3872363 | A1 | 9/2021 |
| JP | 2013072520 | A | 4/2013 |
| JP | 2013164092 | A | 8/2013 |
| KR | 100694909 | B1 | 3/2007 |
| KR | 101836720 | B1 | 3/2018 |

* cited by examiner

*Primary Examiner* — Christopher P Schwartz
(74) *Attorney, Agent, or Firm* — Harness, Dickey & Pierce, P.L.C.

(57) ABSTRACT

A damper includes a piston coupled to a piston rod slidably positioned in a damper tube. A piston rod seal is positioned radially between the piston rod and a first end of the damper tube. A cap is positioned over the first end of the damper tube and includes a side wall positioned in contact with and extending annularly about the first end of the damper tube. An end wall extends radially inwardly from the side wall. A collector radially outwardly extends from the side wall. The cap includes a vent. The side wall includes an end face at an opposite end of the cap as the end wall. The collector is positioned axially between the vent and the end face of the side wall. The collector includes surfaces on which oil passing by the piston rod seal will accumulate.

18 Claims, 7 Drawing Sheets

49
56
74
75
72
34
54
60
62
96
44
30

72
6
84
78
90
90
96
6
106
104
102
76

72
76
78
88
90
84
92
86
80
82

72
76
78
80
82
84
86
88
88
90
90
90
92
96
98
102
104
106
110
112
114
118
120
122
124
126
128
130
132
$D_1$
$D_2$
$D_3$

DAMPER BUMPER CAP WITH COLLECTOR

FIELD

The present disclosure relates to automotive dampers. More particularly, the present disclosure relates to damper bumper cap positioned at a piston rod end of the damper.

BACKGROUND

The statements in this section merely provide background information related to the present disclosure and may not constitute prior art.

Dampers are typically used in conjunction with automotive suspension systems or other suspension systems to absorb unwanted vibrations that occur during movement of the suspension system. In order to absorb these unwanted vibrations, automotive dampers are generally connected between the sprung (body) and the unsprung (suspension/drivetrain) components of the vehicle.

Typical dampers include a piston located within a fluid chamber defined by a damper tube and connected to the sprung mass of the vehicle through a piston rod. The damper tube is connected to the unsprung mass of the vehicle. For the damper to work properly, a seal must be maintained between the piston rod and the damper tube. During standard operation of the damper, dust particles and other contaminants can accumulate on the piston rod and the piston rod seal, which can cause damage to the piston rod and/or the piston rod seal. Such damage can result in oil leakage from the fluid chamber.

There is also a phenomenon called static oil leakage or “weepage” where a very small volume of oil continuously passes by the piston rod seal of the damper. Large variations in operating temperature or pressure may increase static oil leakage. The oil that has leaked past the piston rod seal often times flows along an outer surface of the damper tube. This portion of the damper is readily visible when viewing the underbody of the vehicle. While some oil leakage is typical during normal damper operation, an excess amount of fluid leakage may indicate a need for damper service or replacement. Based on existing bumper cap designs, even the slightest amount of oil leakage is usually directed to the outer visible surface of the damper tube possibly misleading a vehicle operator or inspector as to a need for service. Accordingly, there remains a need for an improved bumper cap solution that directs minor oil leakage away from contact with an external surface of the damper.

SUMMARY

This section provides a general summary of the disclosure, and is not a comprehensive disclosure of its full scope or all of its features.

A damper includes a piston coupled to a piston rod slidably positioned in a damper tube. A piston rod seal is positioned radially between the piston rod and a first end of the damper tube. A cap is positioned over the first end of the damper tube and includes a side wall positioned in contact with and extending annularly about the first end of the damper tube. An end wall extends radially inwardly from the side wall. A collector radially outwardly extends from the side wall. The cap includes a vent. The side wall includes an end face at an opposite end of the cap as the end wall. The collector is positioned axially between the vent and the end face of the side wall. The collector includes surfaces on which oil passing by the piston rod seal will accumulate.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
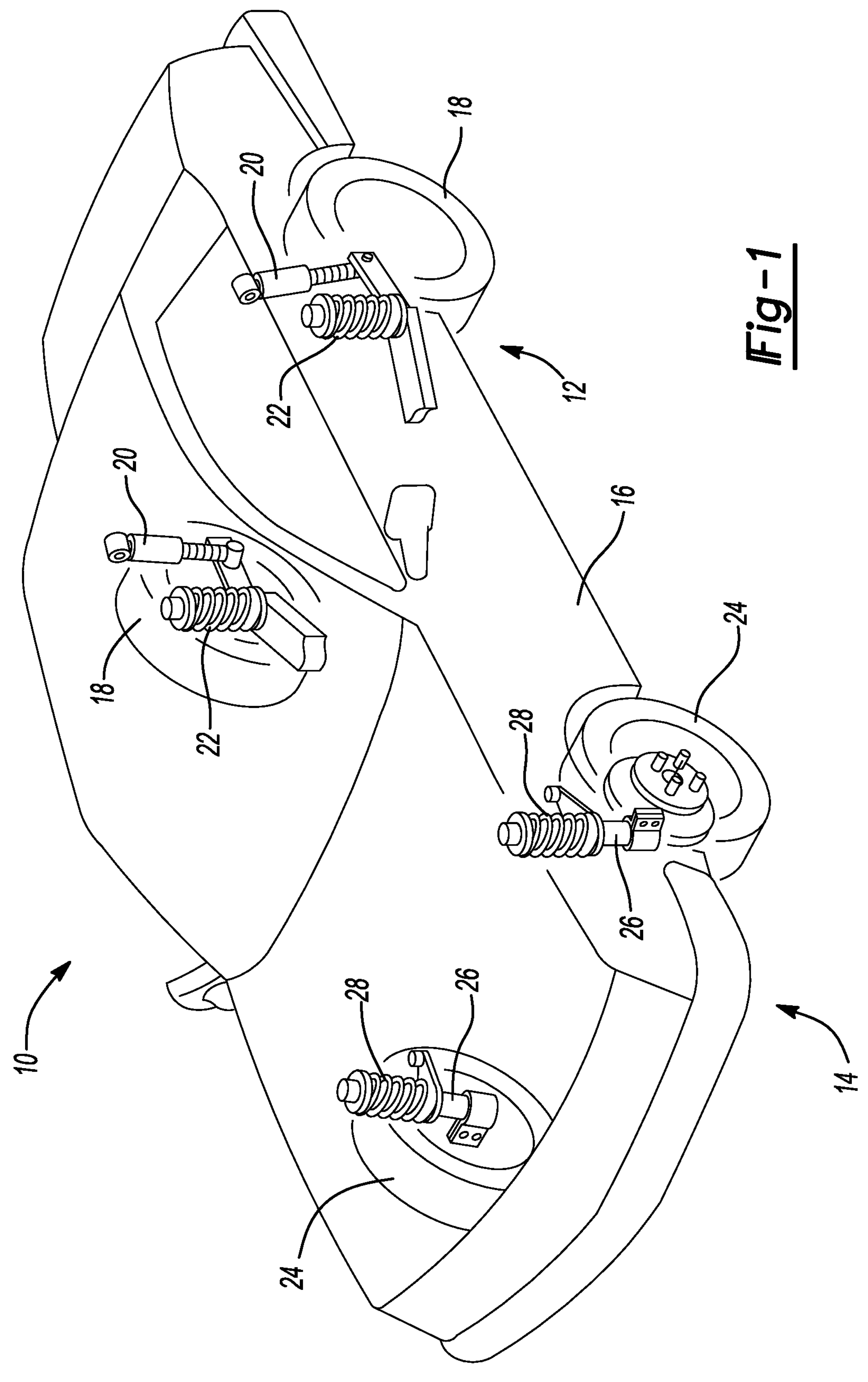
FIG. 1 is an illustration of an exemplary vehicle equipped with four dampers constructed in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a vehicle 10 including a rear suspension 12, a front suspension 14, and a body 16 is illustrated. The rear suspension 12 is adapted to operatively support the vehicle's rear wheels 18. The rear axle assembly is operatively connected to the body 16 by a pair of dampers 20 and a pair of helical coil springs 22. Similarly, front suspension 14 operatively supports the vehicle's front wheels 24. The front axle assembly is operatively connected to body 16 by a second pair of dampers 26 and by a pair of helical coil springs 28. Dampers 20 and 26 serve to dampen the relative motion of the unsprung portion (i.e., front and rear suspensions 14 and 12, respectively) and the sprung portion (i.e., body 16) of vehicle 10. While the vehicle 10 has been depicted as a passenger car having front and rear axle assemblies, dampers 20 and 26 may be used with other types of vehicles or machinery, or in other types of applications such as vehicles incorporating independent front and/or independent rear suspension systems. Further, the term "damper" as used herein is meant to refer to dampers and damper systems in general and thus will include MacPherson struts. It should also be appreciated that the scope of the subject disclosure is intended to include damper systems for stand-alone dampers 20 and coil-over dampers 26.

Figure 2:
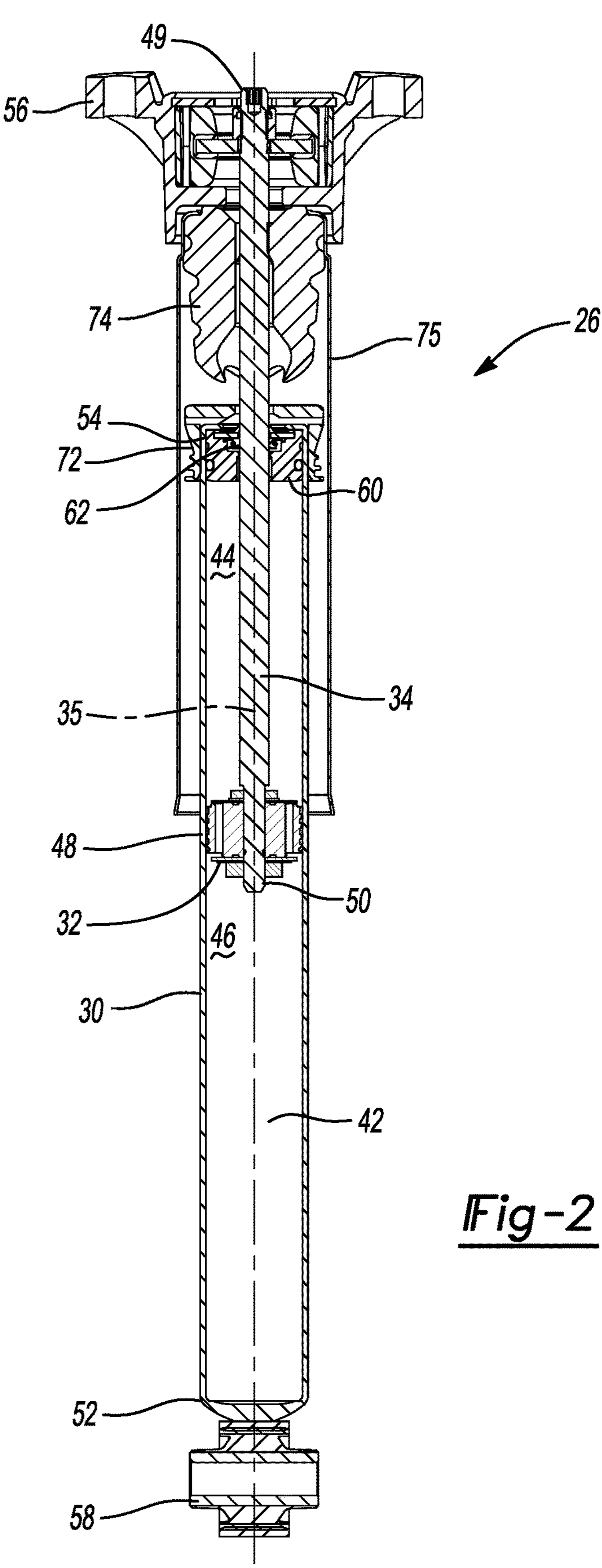
FIG. 2 is a cross-sectional view of a damper constructed in accordance with the teachings of the present disclosure.
Figure 3:
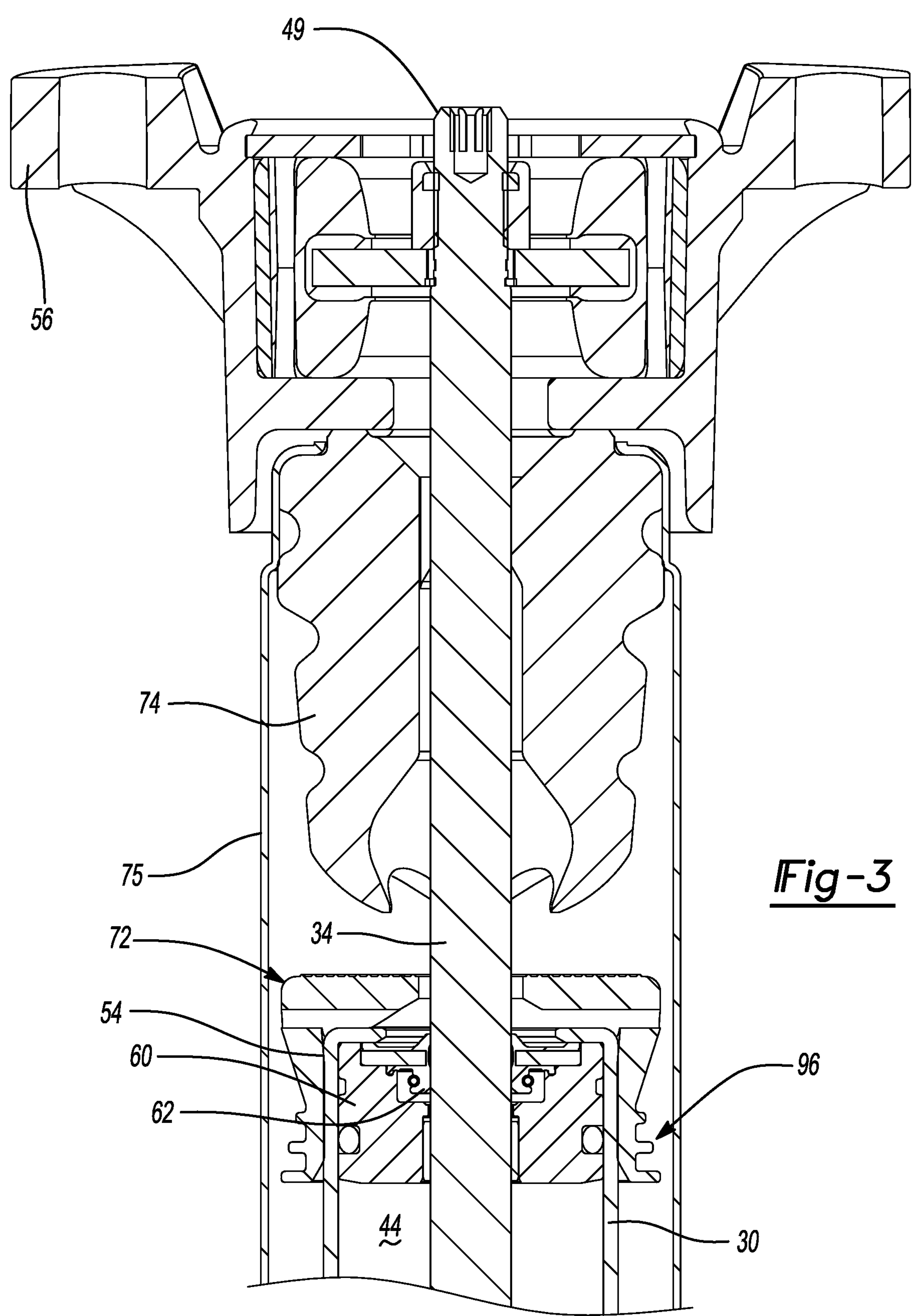
FIG. 3 is an enlarged fragmentary cross-sectional view of the damper including an exemplary bumper cap constructed in accordance with the teachings of the present disclosure.

With reference to FIGS. 2 and 3, damper 26 is shown in greater detail. Damper 26 comprises a damper tube 30, a piston assembly 32, and a piston rod 34. The damper tube 30 and the piston rod 34 extend co-axially along a longitudinal axis 35. The damper tube 30 defines an inner cavity 42. The inner cavity 42 of the damper tube 30 is filled with a hydraulic fluid, such as oil. The piston assembly 32 is slidably disposed within the inner cavity 42 of the damper tube 30 and divides the inner cavity 42 into a first working chamber 44 and a second working chamber 46. A seal 48 is disposed between the piston assembly 32 and the damper tube 30 to permit sliding movement of the piston assembly 32 with respect to damper tube 30 without generating undue frictional forces as well as sealing the first working chamber 44 from the second working chamber 46.

The piston rod 34 extends along the longitudinal axis 35 between a first piston rod end 49 and a second piston rod end 50. The damper tube 30 extends longitudinally between a closed end 52 and a rod side end 54. The second piston rod end 50 is disposed inside the damper tube 30 and is coupled to the piston assembly 32. Accordingly, the piston rod 34 extends longitudinally through the first working chamber 44 and through the rod side end 54 of the damper tube 30. The first piston rod end 49 includes a piston rod mount 56, which is configured to be connected to the body 16 of the vehicle 10 (i.e., the sprung portion of vehicle 10). The closed end 52 of the damper tube 30 includes an attachment fitting 58, which is configured to be connected to the unsprung portion of the suspension 12 and 14. The first working chamber 44 is thus positioned between the rod side end 54 of the damper tube 30 and the piston assembly 32 and the second working chamber 46 is positioned between the closed end 52 of the damper tube 30 and the piston assembly 32. A rod guide 60 is positioned radially between the piston rod 34 and the rod side end 54 of the damper tube 30. A piston rod seal 62 is retained by rod guide 60 and sealingly engages piston rod 34.

Suspension movements of the vehicle 10 will cause extension/rebound or compression movements of piston assembly 32 with respect to damper tube 30. Valving within piston assembly 32 controls the movement of hydraulic fluid between the first working chamber 44 and the second working chamber 46 during movement of the piston assembly 32 within the damper tube 30. It should be appreciated that the damper 26 may be installed in a reverse orientation, where the piston rod mount 56 is connected to the unsprung portion of the suspension 12 and 14 and the attachment fitting 58 of the damper tube 30 is connected to the body 16 (i.e., the sprung portion of vehicle 10). While FIG. 2 shows only damper 26, it is to be understood that damper 20 only differs from damper 26 in the way in which it is adapted to be connected to the sprung and unsprung portions of vehicle 10 and the mounting location of the coil spring 28 relative to the damper 26. It should be further appreciated that the present disclosure relates to dual tube dampers and other types of dampers in addition to the monotube damper depicted in the figures. The bumper cap of the present disclosure is configured to minimize the likelihood of oil leaking past piston rod seal 62 from contacting and running along an outer surface of the outermost tube of the damper.

A damper bumper cap 72 is positioned over the rod side end of the damper tube 30 and the piston rod seal 62. The bumper cap 72 may be made of a variety of different materials, including without limitation, polypropylene, polyamide, or glass-reinforced polyamide. It should also be appreciated that the bumper cap 72 may be made using a variety of manufacturing processes, including without limitation, injection molding. Bumper cap 72 protects the piston rod seal 62 from contact with debris, dirt, or other damper and suspension components such as a jounce bumper 74. A dirt shield 75 is coupled to piston rod mount 56 and at least partially encompasses damper tube 30.

Figure 4:
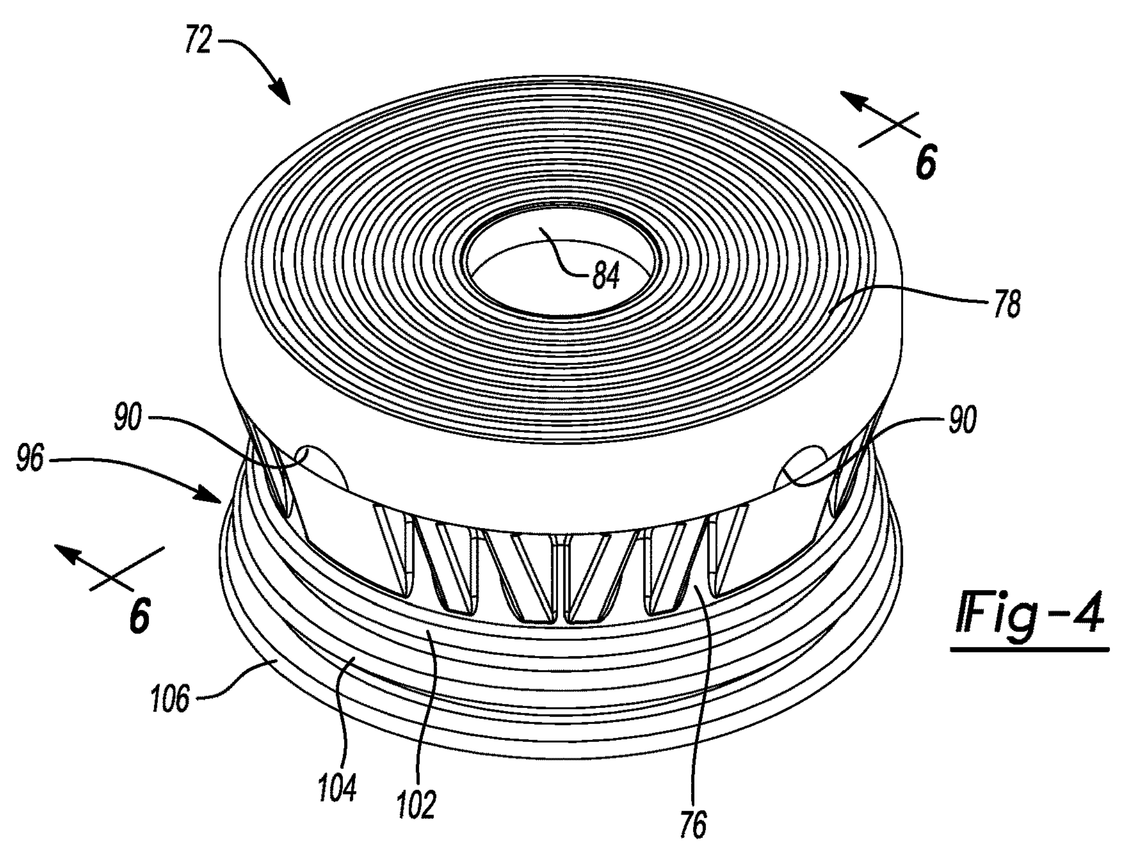
FIG. 4 is a perspective view depicting the bumper cap.
Figure 5:
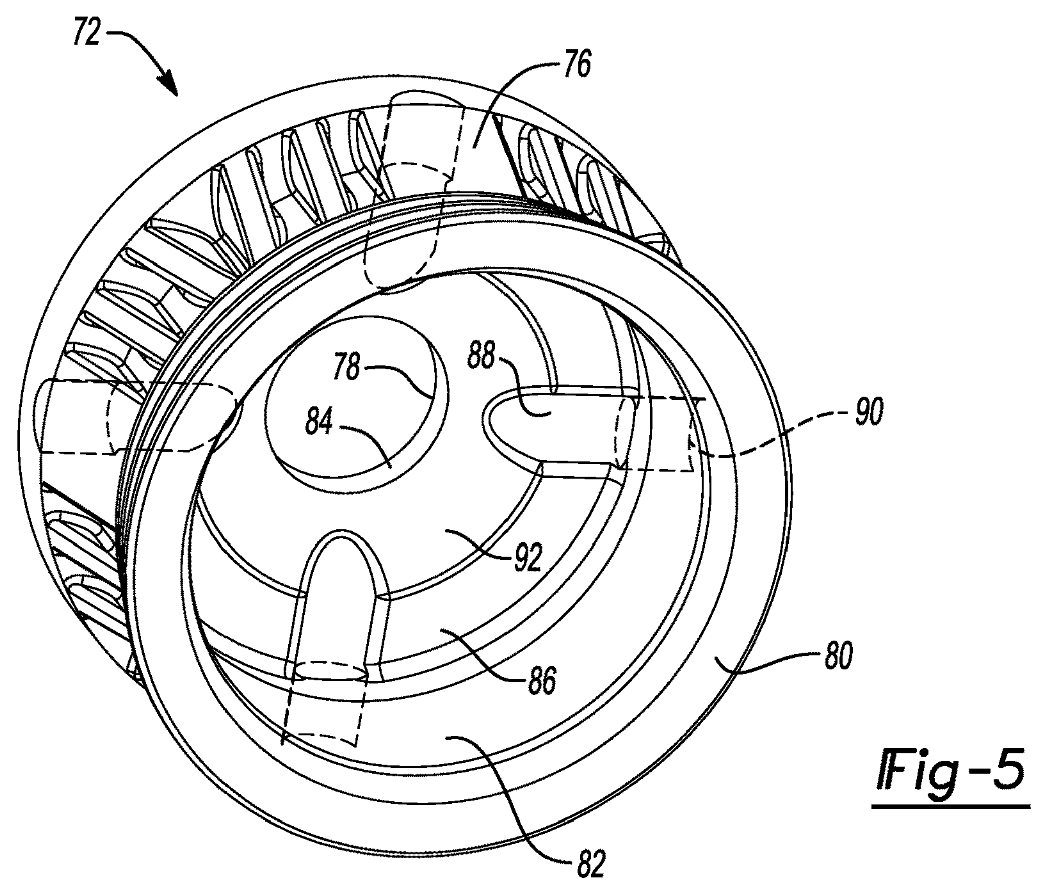
FIG. 5 is another perspective view of the bumper cap.
Figure 6:
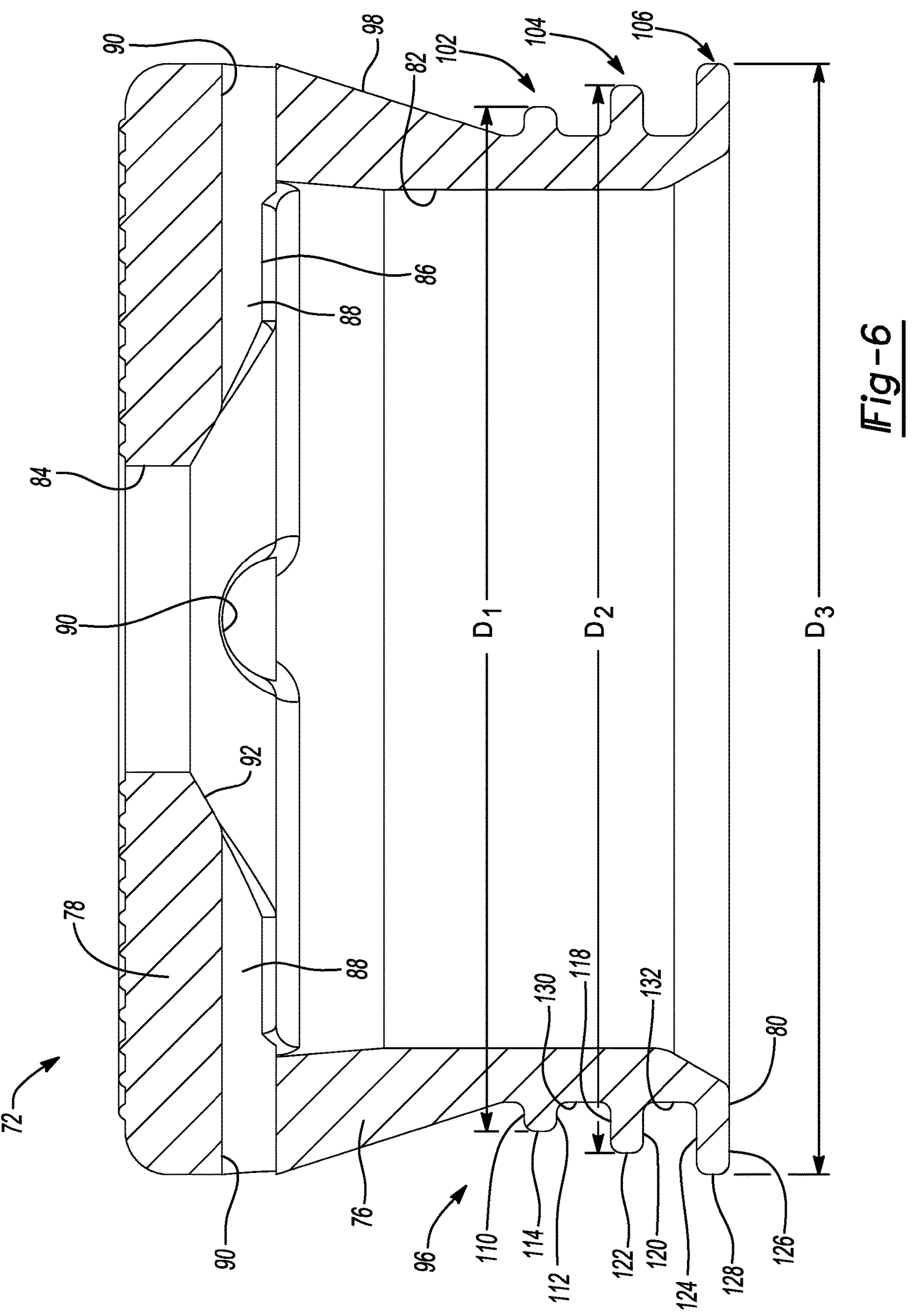
FIG. 6 is a cross-sectional side view of the bumper cap.

With additional reference to FIGS. 4-6, bumper cap 72 includes a circumferentially extending side wall 76 and an end wall 78. Side wall 76 extends annularly about the rod side end 54 of the damper tube 30 and extends longitudinally from end wall 78 to an end face 80. Side wall 76 includes an inner surface 82 that is arranged in contact with damper tube 30 in an interference fit. Inner surface 82 of the side wall 76 of bumper cap 72 is cylindrical in shape and is smooth. Inner surface 82 does not have any ribs or protrusions like conventional damper bumper caps. As a result, oil flow cannot travel between the damper tube 30 and inner surface 82 of side wall 76. This is different from conventional damper bumper caps where ribs typically define a fluid path between the damper tube 30 and the side wall.

End wall 78 extends radially inwardly from side wall 76 and over at least a portion of rod guide 60 to a rod aperture 84. Piston rod 34 extends through rod aperture 84 in end wall 78 of bumper cap 72. End wall 78 includes an inner surface 86 with radially extending channels 88. The radially extending channels 88 on inner surface 86 of end wall 78 are disposed in fluid communication with vents 90 that are configured as side wall openings, in the embodiment depicted, that extend through the side wall 76 at circumferentially spaced locations adjacent to the junction between the side wall 76 and the end wall 78 of the bumper cap 72. Radially extending channels 88 and vents 90 cooperate to allow air, water, dust, and contaminants to flow or drain out from under bumper cap 72 instead of accumulating between end wall 78 of bumper cap 72 and piston rod seal 62. Optionally, inner surface 86 of end wall 78 may include a tapered face 92 adjacent to rod aperture 84, which gives inner surface 86 a concave or conical shape around rod aperture 84. In accordance with this configuration, radially extending channels 88 extend between tapered face 92 and vents 90 to allow air, water, dust, and contaminants to drain from the space created by tapered face 92 on inner surface 86 of end wall 78.

A collector 96 radially outwardly extends from side wall 76. Collector 96 functions to increase the external surface area of bumper cap 72. The increased surface area functions to disburse oil that may pass by piston rod seal 62 from first working chamber 44. As damper 26 is typically oriented at least somewhat vertically, in similar fashion to the orientation depicted in FIG. 2, gravity urges oil that may flow past piston rod seal 62 in a direction toward attachment fitting 58. To minimize the likelihood of the oil impinging or otherwise flowing across damper tube 30, bumper cap 72 employs the combination of features of a sealed engagement between inner surface 82 and damper tube 30, vents 90 and collector 96. Oil that has passed through vents 90 travels across an outer surface 98 of sidewall 76 to reach collector 96. Outer surface 98 may have a frustoconical shape as depicted in FIG. 6. Alternatively, this surface may be shaped as a right circular cylinder.

In the embodiment depicted FIGS. 1-6, collector 96 includes a radially extending first flange 102, a radially extending second flange 104, and a radially extending third flange 106 axially spaced apart from one another. First flange 102 includes a radially outwardly extending first surface 110, an opposite radially outwardly extending second surface 112, and an axially extending cylindrical surface 114 positioned therebetween. First flange 102 increases the surface area of bumper cap 72 by at least the area of first surface 110 and second surface 112. First flange 102 is substantially cylindrically shaped and has a diameter $D_1$. At an axial distance further from vents 90, second flange 104 is axially spaced apart from first flange 102. Second flange 104 includes a radially outwardly extending third surface 118, an opposite radially outwardly extending fourth surface 120 and a cylindrical axially extending surface 122, therebetween. Second flange 104 is substantially cylindrically shaped and exhibits an outer diameter $D_2$. Diameter $D_2$ is greater than diameter $D_1$. At a location yet further axially away from vents 90 is third flange 106. Third flange 106 includes a radially outwardly extending fifth surface 124, an opposite radially extending sixth surface 126, which also may be a portion end face 80, and an axially extending circumferential surface 128 positioned therebetween. Third flange 106 is substantially cylindrically shaped and has a diameter $D_3$ which is greater than $D_2$.

As oil flows past piston rod seal 62 and through vents 90, the oil will begin to be urged by gravity along surface 98. As the volume of oil increases, the oil will be gathered along and dispersed about first surface 110 of first flange 102. If additional oil travels along this path, surface 110 may no longer be sufficient to collect the entire quantity of oil and some of the oil may pass over cylindrical surface 114. Oil may drip from this surface onto third surface 118 of second flange 104 or may continue to travel along first flange 102 in contact with second surface 112. The oil that reaches third surface 118 of second flange 104 will be dispersed along the circumference of bumper cap 72 until this surface can no longer collect and retain the oil that passes through vents 90. At this time, the oil may contact and flow across circumferential surface 122 of second flange 104. In a similar fashion to that previously described, oil may drip from cylindrical surface 122 onto fifth surface 124 of third flange 106 or the oil may continue to adhere to the surface of second flange 104 and contact fourth surface 120. Oil that was on second surface 112 of first flange 102 may flow along a first intermediate surface 130 that is axially positioned between first flange 102 and second flange 104. Similarly, oil flowing along fourth surface 120 of second flange 104 may continue to flow over a second intermediate surface 132 that is axially position between second flange 104 and third flange 106.

Oil contacting fifth surface 124 of third flange 106 will disperse about the periphery of bumper cap 72. If this surface becomes unable to collect additional oil and additional oil is provided, the oil will travel over cylindrical surface 128. Diameter $D_3$ is greater than an outer diameter of damper tube 30. Accordingly, oil that may drip from the outer periphery of third flange 106 is unlikely to contact an outer surface of damper tube 30. It should be appreciated that the significant increase in surface area provided by first flange 102, second flange 104, and third flange 106 reduces the likelihood of a oil from weepage or small leakage past piston rod seal 62 from contacting outer surface of damper tube 30. At a minimum, the provision of collector 96 increases the amount of oil required to have an impingement of oil on an outer surface of damper tube 30.

Figure 7:
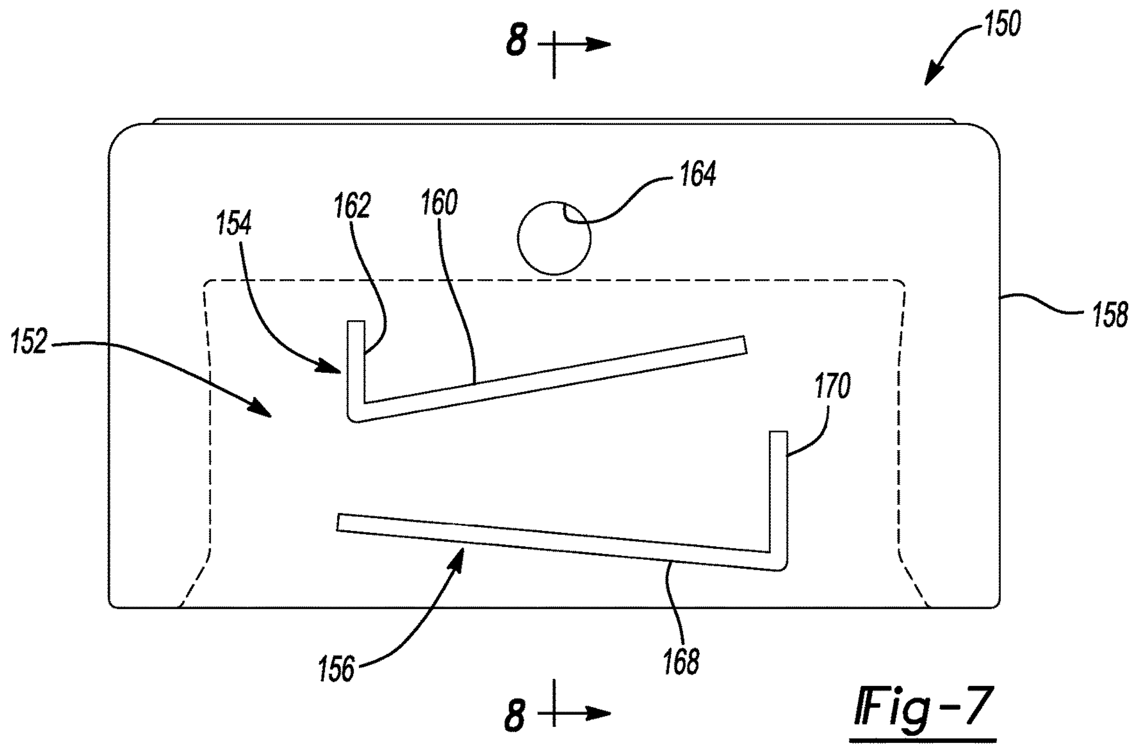
FIG. 7 is a side view of an alternate bumper cap.

FIG. 7 depicts an alternate bumper cap 150. Bumper cap 150 is substantially similar to bumper cap 72 with the exception of the configuration of a collector 152. Collector 152 includes a radially outwardly extending first protrusion 154 and a radially outwardly extending second protrusion 156. First protrusion 154 and second protrusion 156 extend from a side wall 158 substantially similar to side wall 76, previously described. A vent 164 extends through side wall 158 in similar fashion to vents 90 previously described. First protrusion 154 and second protrusion 156 circumferentially extend for a limited arc length and do not extend about the entire periphery of bumper cap 150. First protrusion 154 is shaped as a reservoir including a first base 160 and a first retention wall 162. First base 160 may be sloped such that it does not extend exactly transversely but substantially transversely to longitudinal axis 35 of damper 26. First retention wall 162 extends substantially parallel to longitudinal axis 35. First base 160 slopes downwardly toward first retention wall 162 such that a reservoir for oil may be provided. First protrusion 154 is aligned with vent 164 such that oil passing out of vent 164 would likely impinge first base 160. First protrusion 154 extends radially outwardly from side wall 158 a first distance.

Figure 8:
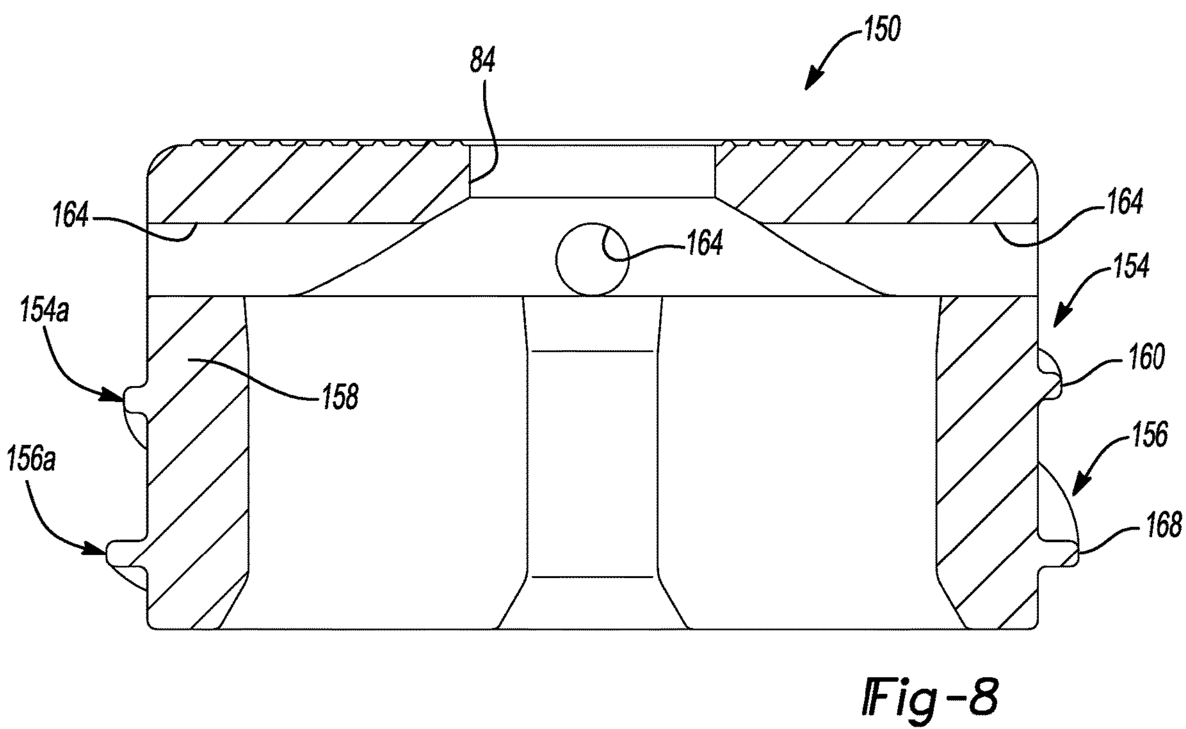
FIG. 8 is a cross-sectional side view of the bumper cap depicted in FIG. 7.

Second protrusion 156 includes a second base 168 and a second retention wall 170. Second base 168 extends substantially perpendicularly with a slight slope in a different direction than first base 160. Second retention wall 170 extends substantially parallel to longitudinal axis 35. Second protrusion 156 extends radially outwardly from side wall 158 a second distance that is greater than the first distance. Second protrusion 156 is positioned to capture oil that may no longer be collected and retained by first protrusion 154. It should be appreciated that additional sets of first and second protrusions 154, 156 may be circumferentially spaced apart from one another and aligned with any other additional vents 164 provided on bumper cap 150 such as first protrusion 154*a* and second protrusion 156*a* shown in FIG. 8.

Figure 9:
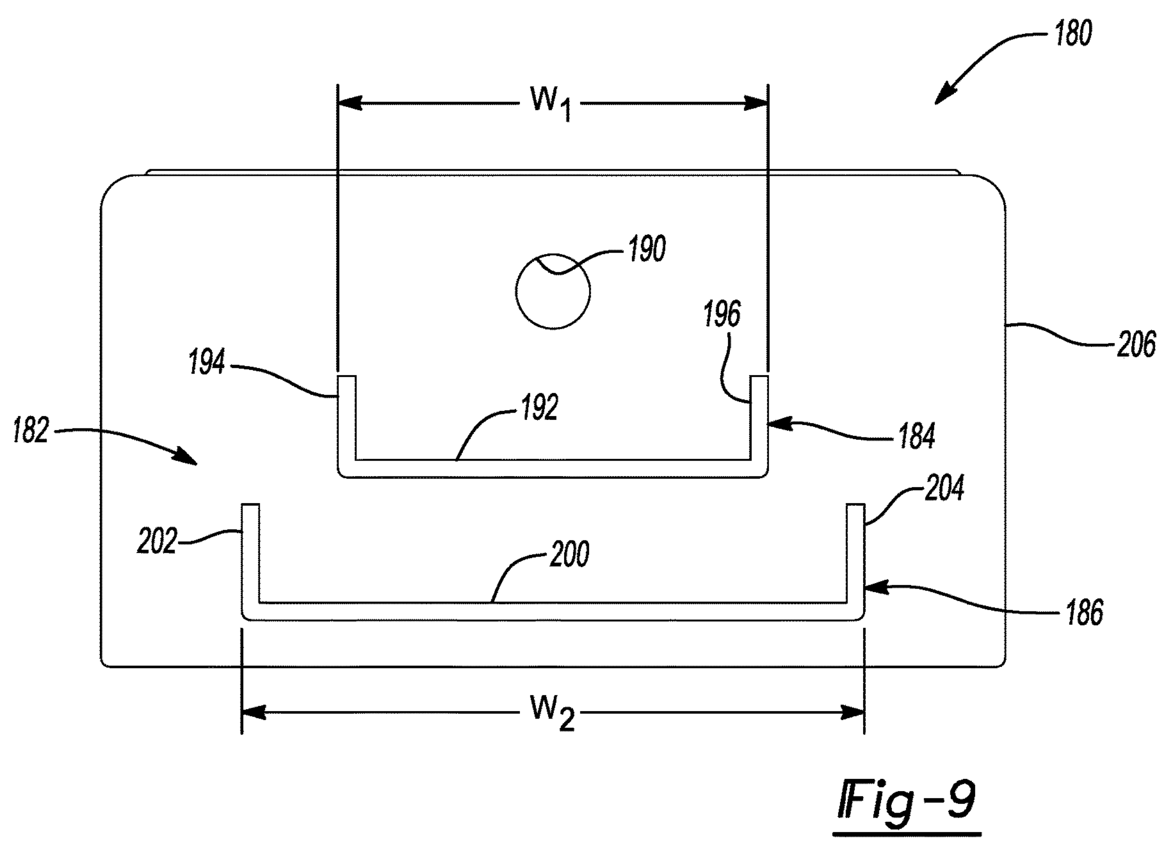
FIG. 9 is a side view of another alternate bumper cap.

FIG. 9 depicts another alternate embodiment cap identified at reference numeral 180. Bumper cap 180 is substantially similar to bumper cap 150. Bumper cap 180 includes a collector 182 including a first basin 184 and a second basin 186 axially spaced apart from one another and aligned with a vent 190. First basin 184 includes a first floor 192 bounded by first and second side walls 194, 196, respectively. First basin 184 includes a width W1. Second basin 186 includes a second floor 200 bounded by first and second side walls 202, 204, respectively. Second basin 186 includes a width W2 greater than the width W1 of first basin 184. As such, oil exiting vent 190 may be retained within first basin 184 until the oil volume exceeds its retention capacity. Additional oil will overflow from first basin 184 and be captured within second basin 186. Additional sets of first and second basins 184, 186 may be circumferentially spaced apart from one another and associated with additional vents 190 provided in bumper cap 180. First basin 184 radially outwardly extends from a side wall 206 a first distance. Second basin 204 radially outwardly extends from side wall 206 a second distance that is greater than the first distance.

Figure 10:
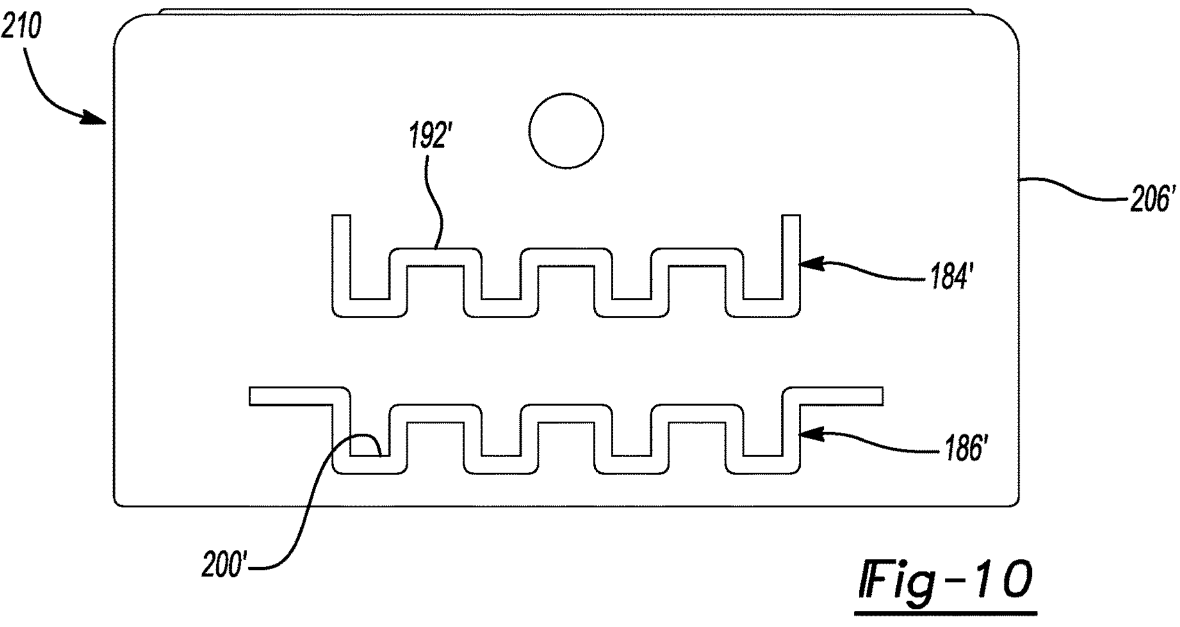
FIG. 10 is a side view of another alternate bumper cap.

FIG. 10 depicts another alternate embodiment bumper cap identified at reference numeral 210. Bumper cap 210 is substantially similar to bumper cap 180. Similar elements will retain like reference numerals including a prime suffix. Bumper cap 210 includes a first basin 184' and a second basin 186'. Floor 192' includes a corrugated shape thereby increasing the surface area of floor 192' relative to floor 192. Similarly, floor 200' of second basin 186' includes a corrugated shape having an increased surface area relative to the surface area of floor 200 depicted in FIG. 9. It is contemplated that first basin 184' radially outwardly extends from side wall 206' a first distance. Second basin 186' radially outwardly extends from side wall 206' a second distance that is greater than the first distance.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A damper for a vehicle, comprising:
- a damper tube extending longitudinally between a first end and a second end;
- a piston rod extending into the first end of the damper tube along a longitudinal axis;
- a piston coupled to the piston rod and slidably positioned in the damper tube;
- a piston rod seal positioned radially between the piston rod and the first end of the damper tube; and
- a cap positioned over the first end of the damper tube, the cap including a side wall positioned in contact with and extending annularly about the first end of the damper tube, an end wall extending radially inwardly from the side wall, and a collector radially outwardly extending from the side wall relative to the longitudinal axis, wherein the end wall of the cap includes a rod aperture through which the piston rod extends, the cap including a vent, the side wall including an end face at an opposite end of the cap as the end wall,
- wherein the collector is longitudinally positioned between the vent and the end face of the side wall such that oil passing by the piston rod seal and through the vent will accumulate on a surface of the collector, wherein the collector includes a first flange radially outwardly extending from the side wall, a second flange radially outwardly extending from the wide wall, and a third flange radially outwardly extending from the side wall, wherein the first, second and third flanges are longitudinally spaced apart from one another.

2. The damper system of claim 1, wherein the side wall of the cap extends longitudinally from the end wall to the end face of the side wall.

3. The damper of claim 1, wherein each of the first flange, the second flange, and the third flange uninterruptedly and circumferentially extend about the side wall.

4. The damper of claim 3, wherein the first flange includes a first outer diameter, the second flange includes a second outer diameter, and the third flange includes a third outer diameter, the third outer diameter being greater than the second diameter which is greater than the first outer diameter.

5. The damper of claim 1, wherein the third flange includes a surface coplanar with the end face.

6. The damper of claim 1, wherein the collector includes a first protrusion radially outwardly extending from the side wall and a second protrusion radially outwardly extending from the side wall, the first protrusion extending from the side wall a first distance, the second protrusion extending from the side wall a second distance, wherein the first distance is less than the second distance.

7. The damper of claim 1, wherein the piston rod extends longitudinally between a first end and a second end, the first end of the piston rod supporting a jounce bumper, the second end of the piston rod being coupled to the piston assembly, and the cap protecting the piston rod seal from contact with the jounce bumper when the damper is in a compressed state.

8. A damper for a vehicle, comprising:
- a damper tube extending longitudinally between a first end and a second end;
- a piston rod extending into the first end of the damper tube along a longitudinal axis;
- a piston coupled to the piston rod and slidably positioned in the damper tube;

a piston rod seal positioned radially between the piston rod and the first end of the damper tube; and a cap positioned over the first end of the damper tube, the cap including a side wall positioned in contact with and extending annularly about the first end of the damper tube, an end wall extending radially inwardly from the side wall, and a collector radially outwardly extending from the side wall relative to the longitudinal axis, wherein the end wall of the cap includes a rod aperture through which the piston rod extends, the cap including a vent, the side wall including an end face at an opposite end of the cap as the end wall, wherein the collector is longitudinally positioned between the vent and the end face of the side wall such that oil passing by the piston rod seal and through the vent will accumulate on a surface of the collector, wherein the collector includes a first protrusion radially outwardly extending from the side wall and a second protrusion radially outwardly extending from the side wall, the first protrusion extending from the side wall a first distance, the second protrusion extending from the side wall a second distance, wherein the first distance is less than the second distance, wherein the first protrusion includes a first base extending substantially transversely to the longitudinal axis and a first wall at an end of the first base that extends substantially parallel to the longitudinal axis.

9. The damper of claim 8, wherein the second protrusion includes a second base extending substantially transversely to the longitudinal axis and a second wall at an end of second base that extends substantially parallel to the longitudinal axis.

10. A damper for a vehicle, comprising:

a damper tube extending longitudinally between a first end and a second end;

a piston rod extending into the first end of the damper tube along a longitudinal axis;

a piston coupled to the piston rod and slidably positioned in the damper tube;

a piston rod seal positioned radially between the piston rod and the first end of the damper tube; and a cap positioned over the first end of the damper tube, the cap including a side wall positioned in contact with and extending annularly about the first end of the damper tube, an end wall extending radially inwardly from the side wall, and a collector radially outwardly extending from the side wall relative to the longitudinal axis, wherein the end wall of the cap includes a rod aperture through which the piston rod extends, the cap including a vent, the side wall including an end face at an opposite end of the cap as the end wall, wherein the collector is longitudinally positioned between the vent and the end face of the side wall such that oil passing by the piston rod seal and through the vent will accumulate on a surface of the collector, wherein the collector includes a first protrusion radially outwardly extending from the side wall and a second protrusion radially outwardly extending from the side wall, the first protrusion extending from the side wall a first distance, the second protrusion extending from the side wall a second distance, wherein the first distance is less than the second distance, wherein the first protrusion includes a first width and the second protrusion includes a second width, the second width being greater than the first width.

11. A damper for a vehicle, comprising:

a damper tube extending longitudinally between a first end and a second end;

a piston rod extending into the first end of the damper tube along a longitudinal axis;

a piston coupled to the piston rod and slidably positioned in the damper tube;

a piston rod seal positioned radially between the piston rod and the first end of the damper tube; and a cap positioned over the first end of the damper tube, the cap including a side wall including an inside surface that is cylindrical in shape, smooth, and arranged in an interference fit with the damper tube such that oil cannot travel between the damper tube and the inside surface of the side wall, the cap further including a vent, an end wall extending radially inwardly from the side wall, and a collector radially outwardly extending from the side wall relative to the longitudinal axis, wherein the end wall of the cap includes a rod aperture through which the piston rod extends, wherein the collector is positioned proximate the vent and extends radially outwardly from the side wall such that oil passing by the piston rod seal and passing through the vent will accumulate on a surface of the collector, wherein the collector includes a first flange radially outwardly extending from the side wall, a second flange radially outwardly extending from the wide wall, and a third flange radially outwardly extending from the side wall, wherein the first, second and third flanges are longitudinally spaced apart from one another.

12. The damper of claim 11, wherein each of the first flange, the second flange, and the third flange uninterruptedly and circumferentially extend about the side wall.

13. The damper of claim 11, wherein the first flange includes a first outer diameter, the second flange includes a second outer diameter, and the third flange includes a third outer diameter, the third outer diameter being greater than the second diameter which is greater than the first outer diameter.

14. The damper of claim 11, wherein the third flange includes a surface coplanar with an end face of the side wall.

15. The damper of claim 11, wherein the collector includes a first protrusion radially outwardly extending from the side wall and a second protrusion radially outwardly extending from the side wall, the first protrusion extending from the side wall a first distance, the second protrusion extending from the side wall a second distance, wherein the first distance is less than the second distance.

16. A damper for a vehicle, comprising:

a damper tube extending longitudinally between a first end and a second end;

a piston rod extending into the first end of the damper tube along a longitudinal axis;

a piston coupled to the piston rod and slidably positioned in the damper tube;

a piston rod seal positioned radially between the piston rod and the first end of the damper tube; and a cap positioned over the first end of the damper tube, the cap including a side wall including an inside surface that is cylindrical in shape, smooth, and arranged in an interference fit with the damper tube such that oil cannot travel between the damper tube and the inside surface of the side wall, the cap further including a vent, an end wall extending radially inwardly from the side wall, and a collector radially outwardly extending from the side wall relative to the longitudinal axis, wherein the end wall of the cap includes a rod aperture through which the piston rod extends, wherein the collector is positioned proximate the vent and extends radially outwardly from the side wall such that oil passing by the piston rod seal and passing through the vent will accumulate on a surface of the collector, wherein the collector includes a first protrusion radially outwardly extending from the side wall and a second protrusion radially outwardly extending from the side wall, the first protrusion extending from the side wall a first distance, the second protrusion extending from the side wall a second distance, wherein the first distance is less than the second distance, wherein the first protrusion includes a first base extending substantially transversely to the longitudinal axis and a first wall at an end of the first base that extends substantially parallel to the longitudinal axis.

17. The damper of claim 16, wherein the second protrusion includes a second base extending substantially transversely to the longitudinal axis and a second wall at an end of second base that extends substantially parallel to the longitudinal axis.

18. A damper for a vehicle, comprising:

a damper tube extending longitudinally between a first end and a second end;

a piston rod extending into the first end of the damper tube along a longitudinal axis;

a piston coupled to the piston rod and slidably positioned in the damper tube;

a piston rod seal positioned radially between the piston rod and the first end of the damper tube; and a cap positioned over the first end of the damper tube, the cap including a side wall including an inside surface that is cylindrical in shape, smooth, and arranged in an interference fit with the damper tube such that oil cannot travel between the damper tube and the inside surface of the side wall, the cap further including a vent, an end wall extending radially inwardly from the side wall, and a collector radially outwardly extending from the side wall relative to the longitudinal axis, wherein the end wall of the cap includes a rod aperture through which the piston rod extends, wherein the collector is positioned proximate the vent and extends radially outwardly from the side wall such that oil passing by the piston rod seal and passing through the vent will accumulate on a surface of the collector, wherein the collector includes a first protrusion radially outwardly extending from the side wall and a second protrusion radially outwardly extending from the side wall, the first protrusion extending from the side wall a first distance, the second protrusion extending from the side wall a second distance, wherein the first distance is less than the second distance, wherein the first protrusion includes a first width and the second protrusion includes a second width, the second width being greater than the first width.

* * * * *